July 2, 1957     J. C. MONAHAN     2,797,945
EXPANSIBLE GUARD FOR SHAFT SEALS
Filed Aug. 20, 1954
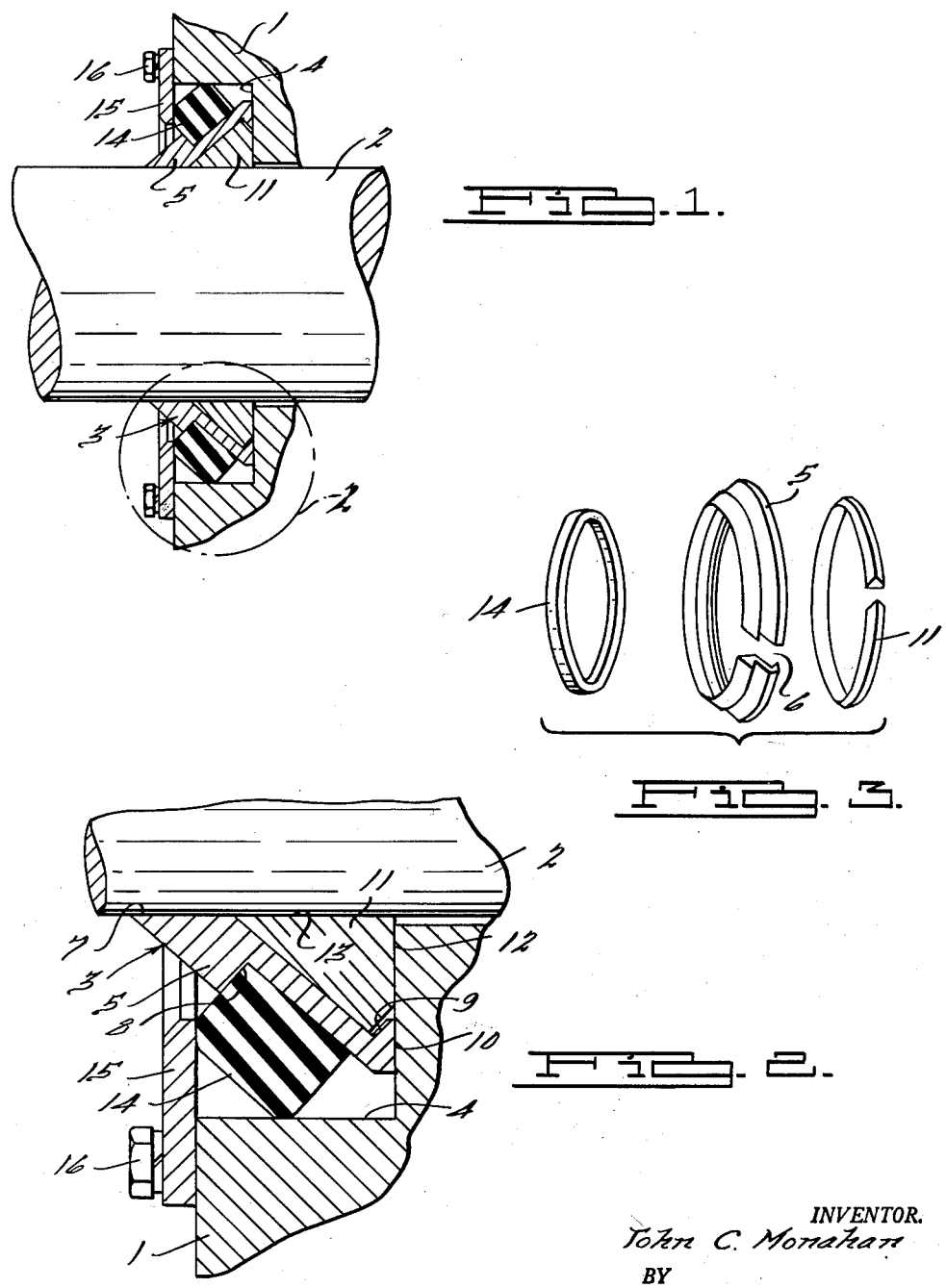
INVENTOR.
John C. Monahan
BY
Harness, Dickey & Pierce
ATTORNEYS.

United States Patent Office 2,797,945
Patented July 2, 1957

2,797,945

EXPANSIBLE GUARD FOR SHAFT SEALS

John C. Monahan, East Detroit, Mich.

Application August 20, 1954, Serial No. 451,233

1 Claim. (Cl. 288—2)

The present invention relates to improvements in guards for protecting seal packings and is generally of the type disclosed in Monahan Patent No. 2,634,145.

Seal packings are conventionally employed with mechanisms such as hydraulic or pneumatic pistons and cylinder constructions, or other constructions in which movable shafts are mounted and sealed to prevent leakage around the rod. The guard of the present invention is illustrated in connection with the gland of a conventional hydraulic cylinder and is disposed within a recess formed within the gland and embraces the shaft to prevent the accumulation of abrasive foreign particles from working their way into the packing gland. The guard may also be used for other purposes such as to prevent foreign particles from scoring the reciprocating parts in punch press dies, or to exclude such foreign material from any closely fitted and relatively reciprocable cylindrical mating members.

One of the primary objects of the present invention is to provide an improved guard construction of the type mentioned which will permit greater expansion and contraction of the guard to accommodate wide variations in rod diameter.

Another object of the invention is to provide an improved guard which is better accommodated to a wider variation in rod diameter, but which will retain a concentric shape during relative movement between the guard and the shaft which it embraces.

Another object of the invention is to provide an improved guard of the type mentioned which includes a plurality of parts, but which are held together as a unit for shipment.

Other objects of the invention will become apparent from the following specification, the drawing relating thereto and from the claims hereinafter set forth.

In the drawing in which like numerals are used to designate like parts in the several views throughout:

Figure 1 is a cross-sectional view of a portion of a cylinder gland showing the seal guard of the present invention applied thereto in its relationship to a movable shaft;

Fig. 2 is an enlarged view taken within the circle 2 of Fig. 1;

Fig. 3 is a separated perspective view of the elements making up the seal guard of Figs. 1 and 2.

Referring to the drawing, a portion of a cylinder gland is illustrated at 1 with a reciprocating piston rod 2 projecting therethrough. It will be understood that the present invention is illustrated in connection with a hydraulic cylinder construction, the cylinder not being illustrated, but which may be of the same type as that shown in the Monahan patent above referred to with the packing disposed within the nose of the cylinder in the usual way, embracing the rod 2 and held in place by the gland 1.

A seal guard generally indicated at 3 is adapted to be received within an annular recess 4 formed in one face of the gland 1. The seal guard comprises a generally frusto-conical metal member 5 which is in the form of a split ring, as best shown in Fig. 3. The spacing or opening provided by the split is indicated at 6 and is exaggerated for purpose of illustration, but such spacing may be varied to suit conditions.

The member 5 is preferably formed of brass, bronze or other bearing material softer than the material of the rod 2. The frusto-conical member 5 terminates at its smaller end in an annular knife edge indicated at 7 which embraces and engages the periphery of the rod 2.

The member 5 is formed with an outwardly directed annular shoulder 8 formed on the outer surface thereof adjacent the smaller end thereof and is also formed with an oppositely directed annular shoulder 9 on the inner face thereof formed adjacent the larger end thereof.

The larger end of the member 5 terminates in an annular surface 10 substantially normal to the axis of the shaft 2 which is adapted to abut against and engage the adjacent face of the recess 4.

The seal guard also includes another split ring member 11, formed of a material similar to member 5, which has an outer shape complementary to the shape of the inner face of the member 5 so that it abuts against the adjacent surface of the inner member 5 and against the adjacent surface of the shoulder 9. The member 11 is also formed with an annular face 12 which is adapted to abut against the adjacent face of the recess 4, and is also formed with an annular inner face 13 which is substantially parallel to the axis of the rod 2 and adapted to bear thereagainst, and parallel to, and in line with, the face of the knife edge 7.

It will be appreciated that the member 11 may be assembled to the member 5 by snapping it under the shoulder 9 and will not become dislodged during shipment.

The guard 3 also includes an annular, resilient nonmetallic member 14, preferably of rubber, which engages the outer surface of the member 5 and abuts against the outer shoulder 8. The member 14 is snapped over the member 5 so that the elements 5, 11 and 14 make up a unitary guard with all of the elements held together for handling.

The unit 3 is disposed within the recess 4 and, when in the position shown in Fig. 1, one edge of the resilient member 14 engages the adjacent face of the recess 4 of the gland and the opposite face is engaged by a removable annular retainer ring 15 which may be removably secured to the face of the gland 1 by means of screws 16.

When the elements 5, 11 and 14 are assembled to provide the guard unit 3, the split rings 5 and 11 are rotatably displaced with respect to one another so that the openings formed therethrough by the splits are out of line. Thus there is no through passage for any foreign material through the guard unit.

The shoulder 9 is preferably at an angle of approximately 90° or less to the adjacent outer surface of the member 5 so that the members 5 and 11 will move as a unit and follow each other to compensate for variations in rod diameter. The members 5 and 11 will also float radially as a unit with respect to the shaft because of the resilient connection between these elements and the gland 1 and retainer ring 15 due to the interposition of the resilient member 14 and its contact with the gland 1 and retainer ring 15.

Formal changes may be made in the specific embodiment of the invention described without departing from the spirit of the invention, the scope of which is commensurate with the appended claim.

What is claimed is:

A seal guard comprising a generally frusto-conical and hollow split ring member having substantially parallel outer and inner surfaces and having oppositely directed and axially spaced shoulders formed on said outer and inner surfaces thereof, a resilient nonmetallic member engaging the outer surface of said member and disposed against the shoulder on the outer surface of said member, another split ring member having an outer side coextensive with the inner surface of said frusto-conical member and of a shape complementary to the shape of said inner surface resiliently engaging said inner surface and abutting against the shoulder formed on the inner surface of said first-named member, and said other split ring member having an inner diameter corresponding in size to the smallest inner diameter of said first-named member.

References Cited in the file of this patent

UNITED STATES PATENTS

| | | |
|---|---|---|
| 894,880 | Garlock | Aug. 4, 1908 |
| 1,988,216 | Ryan | Jan. 15, 1935 |
| 2,090,627 | Hall | Aug. 24, 1937 |
| 2,634,145 | Monahan | Apr. 7, 1953 |

FOREIGN PATENTS

| | | |
|---|---|---|
| 432,729 | Great Britain | Aug. 1, 1935 |